UNITED STATES PATENT OFFICE.

ALBRECHT HEIL, OF FRANKFORT, GERMANY, ASSIGNOR OF ONE-HALF TO CONRAD HUBERT AND ONE-HALF TO SAMUEL STERN, BOTH OF NEW YORK, N. Y.

GALVANIC CELL.

1,053,505. Specification of Letters Patent. Patented Feb. 18, 1913.

No Drawing. Original application filed January 3, 1911. Serial No. 600,567. Divided and this application filed June 19, 1911. Serial No. 634,146.

*To all whom it may concern:*

Be it known that I, ALBRECHT HEIL, a subject of the German Emperor, and resident of Frankfort, Germany, have invented certain new and useful Improvements in Galvanic Cells, of which the following is a specification.

This invention relates to a galvanic cell and more especially to a galvanic cell of the kind described in my application Serial No. 600,567 filed January 3rd, 1911, of which the present application is a division. In said cell the depolarizing mass is formed of an intimate mixture of graphite and dark brown manganic hydrate, which is the hydrate of the sesquioxid of manganese, corresponding to the formula $Mn(OH)_3$.

Now thorough investigation has shown that under certain conditions a hydrate of manganese dioxid may be obtained which is as excellent an electric conductor as the dark brown manganic hydrate and which, as to its effect, not only is fully equal to manganic hydrate, but is superior to it as to the tension obtained by reason of its greater percentage of oxygen (1.7 volts against 1.6 volts). Such an efficient hydrate of manganese dioxid is obtained by adding hypochlorite of soda to manganese lyes. When well washed the hydrate thus obtained has a deep black color and may be extremely easily reduced; it is however sufficiently lasting in the cell to not spend uselessly its energy during the period of rest of the cell.

For making up the depolarizing mass the deep black good conducting hydrate of manganese dioxid is intimately mixed with finely powdered carbon (graphite) and is employed in the usual manner as a depolarizing electrode in a porous envelop with a carbon electrode opposite a zinc electrode in a solution of nitrate of ammonium or chlorid of ammonium or the like. Thus a cell is obtained the depolarizing electrode of which has at equal weight and with the same electrolyte a much higher output than a depolarizing electrode made of the best and purest manganese dioxid. Such cells yield very constant and strong current, keep very well both during rest and work and do not produce evaporations of any kind. The electromotive power is 1.7 volts.

I claim:

1. A galvanic cell comprising positive and negative elements, and a depolarizing mass composed of an intimate mixture of deep black good conducting hydrate of manganese dioxid and carbon.

2. A galvanic cell comprising a positive and negative element and a depolarizing mass containing deep black good conducting hydrate of manganese dioxid.

3. A galvanic cell comprising a positive zinc element, a negative carbon element, and a depolarizing mass for the negative carbon element consisting of an intimate mixture of deep black good-conducting hydrate of manganese dioxid and carbon.

4. A galvanic cell comprising a positive zinc element, a negative carbon element, and a depolarizing mass for the negative carbon element containing deep black good-conducting hydrate of manganese dioxid.

In testimony whereof I have hereunto set my hand in presence of two witnesses.

ALBRECHT HEIL.

Witnesses:
JEAN GRUND,
CARL GRUND.

It is hereby certified that in Letters Patent No. 1,053,505, granted February 18, 1913, upon the application of Albrecht Heil, of Frankfort, Germany, for an improvement in "Galvanic Cells," an error appears in the printed specification requiring correction as follows: Line 57, for the word "block" read *black;* and that the said Letters Patent should be read with this correction therein that the same may conform to the record of the case in the Patent Office.

Signed and sealed this 25th day of March, A. D., 1913.

[SEAL.]

C. C. BILLINGS,
*Acting Commissioner of Patents.*